United States Patent
Kim et al.

(10) Patent No.: US 9,399,193 B2
(45) Date of Patent: Jul. 26, 2016

(54) DRAW SOLUTE FOR FORWARD OSMOSIS, DRAW SOLUTION INCLUDING THE SAME, FORWARD OSMOSIS WATER TREATMENT DEVICE USING THE SAME, AND FORWARD OSMOSIS METHOD FOR WATER TREATMENT USING THE SAME

(75) Inventors: Jae-Eun Kim, Hwaseong-si (KR); Bo-Kyung Jung, Seoul (KR); Jung-Im Han, Yongin-si (KR); Hyo Kang, Seoul (KR); Hyo-Rang Kang, Anyang-si (KR); Sung-Soo Han, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 814 days.

(21) Appl. No.: 13/398,406

(22) Filed: Feb. 16, 2012

(65) Prior Publication Data

US 2012/0211423 A1 Aug. 23, 2012

(30) Foreign Application Priority Data

Feb. 18, 2011 (KR) .................. 10-2011-0014672
Jan. 10, 2012 (KR) .................. 10-2012-0003153

(51) Int. Cl.
| | | |
|---|---|---|
| *B01D 61/00* | (2006.01) | |
| *C08G 73/02* | (2006.01) | |
| *C08L 79/02* | (2006.01) | |
| *C08F 220/54* | (2006.01) | |
| *C02F 1/44* | (2006.01) | |

(52) U.S. Cl.
CPC ............ *B01D 61/002* (2013.01); *B01D 61/005* (2013.01); *C08F 220/54* (2013.01); *C08G 73/0233* (2013.01); *C08L 79/02* (2013.01); *C02F 1/445* (2013.01)

(58) Field of Classification Search
CPC ................... B01D 2311/103; B01D 2311/106; B01D 61/005; B01D 61/002; C02F 1/445; C08G 73/0233; C08L 79/02; C08F 220/54
USPC .......................................... 523/125; 525/54.1
See application file for complete search history.

(56) References Cited

U.S. PATENT DOCUMENTS

| | | | |
|---|---|---|---|
| 4,792,404 A | 12/1988 | Swedo et al. | |
| 5,426,154 A * | 6/1995 | Mikami ................ | C08F 259/04 522/127 |
| 5,512,176 A | 4/1996 | Blair | |
| 5,679,254 A | 10/1997 | Chakrabarti | |
| 6,486,213 B1 * | 11/2002 | Chen ........................ | A61K 8/91 514/772.1 |
| 2005/0130867 A1 | 6/2005 | Vaidya et al. | |
| 2005/0169882 A1 * | 8/2005 | Lowe et al. ................ | 424/78.27 |
| 2006/0157248 A1 | 7/2006 | Hoefer et al. | |
| 2010/0155329 A1 | 6/2010 | Iyer | |
| 2012/0267308 A1 * | 10/2012 | Carmignani et al. ......... | 210/644 |

FOREIGN PATENT DOCUMENTS

| | | |
|---|---|---|
| CN | 101891281 A | 11/2010 |
| EP | 1832341 A1 | 9/2007 |
| JP | 2010-274252 A | 12/2010 |
| WO | WO-2010/088170 A2 | 8/2010 |

OTHER PUBLICATIONS

Bach, Q. V., Moon, J.-R., Lee, D. S. and Kim, J.-H. (2008), Lower critical solution temperature behavior of amphiphilic copolymers based on polyaspartamide derivatives. J. Appl. Polym. Sci., 107: 509-513. doi: 10.1002/app.27138.*
Lutz Point by Point Comparison of Two Thermosensitive Polymers Exhibiting a Similar LCST: Is the Age of Poly(NIPAM) Over? J. Am. Chem. Soc. 2006, 128, 13046-13047.*
Fujishige Intrinsic Viscosity-Molecular Weight Relationships for Poly(N-isopropylacrylamide) solutions Polymer Journal, vol. 19, No. 3, pp. 297-300 (1987).*
Yu Synthesis and characterization of thermoresponsive hydrogels cross-linked with acryloyloxyethylaminopolysuccinimide Colloid Polym Sci (2007) 285:1553-1560.*
Wantanabe New Biodegradable and Thermoresponsive Polymers Based on Amphiphilic Poly(asparagine) Derivatives Macromol. Symp. 2007, 249-250, 509-514.*

Moon et. al. Biodegradable thermo- and ph-responsive hydrogels based on amphiphilic polyaspartamide derivatives containing n,n-diisopropylamine pendants Macromolecular Research, vol. 16, No. 6, pp. 489-491 (2008).*

Chinese Office Action issued in corresponding Chinese Applciation No. 201210039783.5, issued Aug. 4, 2014.

Tang, Tian. "Thermo-responsive Poly(methyl methacrylate)-block-poly(N-isopropylacrylamide) Block Copolymers synthesized by RAFT Polymerization: Micellization and Gelation." Macromolecular Chemist and Physics. 2006, 207, pp. 1718-1726.

Dimitrov, Ivaylo. "Thermosensitive water-soluble copolymers with double responsive reversible interacting entities." Progress in Polymer Science. 32(2007. pp. 1275-1343.

Cammas, S. "Thermo-responsive polymer nanoparticles with a core-shell micelle structure as site-specific drug carriers." Journal of Controlled Release. 1997, 48, pp. 157-164.

Reddy, M. Savitha. "Novel oral colon-specific drug delivery systems for pharmacotherapy of peptide and nonpeptide drugs" Drugs of Today. 1999, 35(7); pp. 537-580.

Tadaaki Inoue, et al., "Temperature sensitivity of a hydrogel network containing different LCST oligomers grafted to the hydrogel backbone", Polymers Gels and Networks 5, pp. 561-575, (1997).

European Search Report dated May 29, 2012.

Japanese Office Action issued in Japanese Patent Application No. 2012-032565, dated Nov. 2, 2015.

* cited by examiner

*Primary Examiner* — David C Mellon
*Assistant Examiner* — Liam Royce
(74) *Attorney, Agent, or Firm* — Harness, Dickey & Pierce, P.L.C.

(57) ABSTRACT

A draw solute for forward osmosis may include a copolymer including a first structural unit, where a temperature-sensitive side chain is graft polymerized, and a second structural unit including a hydrophilic functional group. The temperature-sensitive side chain may include a structural unit for a side chain including a temperature-sensitive moiety. The temperature-sensitive moiety may be represented by Chemical Formula 1, Chemical Formula 2, or Chemical Formula 3:

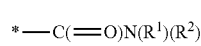

[Chemical Formula 1]

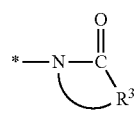

[Chemical Formula 2]

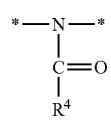

[Chemical Formula 3]

wherein $R^1$ and $R^2$ are each independently hydrogen or a linear or branched C3 to C5 alkyl group, provided that at least one of $R^1$ and $R^2$ is not hydrogen, $R^3$ is a C3 to C5 alkylene group, and $R^4$ is a linear or branched C3 to C5 alkyl group. The draw solute may be used to form an osmosis draw solution for use in a forward osmosis water treatment device and method.

18 Claims, 5 Drawing Sheets

DRAW SOLUTE FOR FORWARD OSMOSIS, DRAW SOLUTION INCLUDING THE SAME, FORWARD OSMOSIS WATER TREATMENT DEVICE USING THE SAME, AND FORWARD OSMOSIS METHOD FOR WATER TREATMENT USING THE SAME

CROSS-REFERENCE TO RELATED APPLICATIONS

This application claims priority under 35 U.S.C. §119 to Korean Patent Application No. 10-2011-0014672, filed in the Korean Intellectual Property Office on Feb. 18, 2011, and Korean Patent Application No. 10-2012-0003153, filed in the Korean Intellectual Property Office on Jan. 10, 2012, the entire contents of each of which are incorporated herein by reference.

BACKGROUND

1. Field

A draw solute for forward osmosis, a draw solution including the draw solute, a forward osmosis water treatment device using the same, and a forward osmosis method for water treatment using the same are disclosed herein.

2. Description of the Related Art

Osmosis (or forward osmosis) refers to a phenomenon in which water in a portion of lower solute concentration moves to a solution of higher solute concentration. On the other hand, reverse osmosis is a method of artificially adding pressure to move water in the opposite direction.

Desalination through reverse osmosis is a known technique in the field of water treatment. Generally, reverse osmosis desalination involves artificially adding a relatively high pressure to move water in the opposite direction through a membrane, thereby producing fresh water. Since reverse osmosis requires a relatively high pressure, it also has a higher energy consumption. To increase energy efficiency, forward osmosis using the principle of osmotic pressure has been suggested. As a solute for the osmosis draw solution, ammonium bicarbonate, sulfur dioxide, aliphatic alcohols, aluminum sulfate, glucose, fructose, potassium nitrate, and the like have been used. Among them, an ammonium bicarbonate draw solution is most commonly known, which may be decomposed into ammonia and carbon dioxide and separated at a temperature of about 60° C. after forward osmosis. Furthermore, newly suggested draw solution materials include magnetic nanoparticles having a hydrophilic peptide attached thereto (separated by a magnetic field), a polymer electrolyte such as a dendrimer (separated by a UF or NF membrane), and the like.

In the case of ammonium bicarbonate, it should be heated to about 60° C. or more so as to be vaporized, thus requiring higher energy consumption. Also, since complete removal of ammonia is practically difficult, it is less than desirable to use it as drinking water due to the odor of ammonia. In the case of the magnetic nanoparticles, it is relatively difficult to redisperse magnetic particles that are separated and agglomerated by a magnetic field. It is also relatively difficult to completely remove the nanoparticles, and thus the toxicity of the nanoparticles should be considered. In the case of a polymer electrolyte, polymer ion (dendrimer, protein, etc.) technology requires a nanofiltration or ultrafiltration membrane filter due to the $R_H$ size of the polymer of several to dozens of tens of nanometers. It is also relatively difficult to redisperse the agglomerated polymer after filtering.

SUMMARY

Various embodiments relate to a draw solute for forward osmosis having a lower energy requirement for separation and recovery.

Various embodiments relate to a forward osmosis water treatment device using an osmosis draw solution including the draw solute for forward osmosis.

Various embodiments relate to a forward osmosis method for water treatment using the draw solute for forward osmosis.

According to a non-limiting embodiment, a draw solute for forward osmosis may include a copolymer including a first structural unit and a second structural unit. The first structural unit may include a first main chain and a first side chain. The first side chain may be a temperature-sensitive side chain that is graft polymerized to the first main chain. The temperature-sensitive side chain may include at least one structural unit for a side chain (side structural unit) including a temperature-sensitive moiety. The second structural unit may include a hydrophilic functional group.

The temperature-sensitive moiety may be a monovalent substituent represented by the following Chemical Formula 1, a monovalent substituent represented by the following Chemical Formula 2, or a divalent substituent represented by the following Chemical Formula 3:

[Chemical Formula 1]

wherein, in the above Chemical Formula 1, $R^1$ and $R^2$ are each independently hydrogen or a linear or branched C3 to C5 alkyl group, provided that at least one of $R^1$ and $R^2$ is not hydrogen,

[Chemical Formula 2]

wherein, in the above Chemical Formula 2, $R^3$ is a C3 to C5 alkylene group, and

[Chemical Formula 3]

wherein, in the above Chemical Formula 3,

$R^4$ is a linear or branched C3 to C5 alkyl group.

At least one of the first main chain and the second structural unit of the copolymer may include a structural unit derived from a vinyl-based compound, a cyclic imide represented by $R(CO)_2NH$ (where R is a C2 to C6 alkylene group), and a combination thereof.

The structural unit for the side chain including a temperature-sensitive moiety may be a structural unit represented by the following Chemical. Formula 4, a structural unit represented by the following Chemical Formula 5, or a structural unit represented by the following Chemical Formula 6:

[Chemical Formula 4]

[Chemical Formula 5]

[Chemical Formula 6]

wherein, in Chemical Formulas 4 to 6, $R^5$ and $R^6$ are each independently a linear or branched C3 to C5 alkyl group, and $R^7$ is a C3 to C5 alkylene group.

The temperature-sensitive side chain may include one selected from the structural unit represented by Chemical Formula 4, the structural unit represented by Chemical Formula 5, the structural unit represented by Chemical Formula 6, and a combination thereof.

The temperature-sensitive side chain may include n of the structural unit represented by Chemical Formula 4, the structural unit represented by Chemical Formula 5, or the structural unit represented by Chemical Formula 6, wherein n may be an integer from 2 to 30.

The structural unit for the side chain including a temperature-sensitive moiety may be derived from one selected from N-isopropylacrylamide (NIPAM), N,N-diethylacrylamide (DEAAM), N-vinylcaprolactam (VCL), and a combination thereof.

The hydrophilic functional group may include one selected from hydrogen, a hydroxy group, an amide group, and a combination thereof.

The second structural unit may include a second main chain and a second side chain. The hydrophilic functional group may be a substituent in the second main chain or the second side chain of the second structural unit.

The copolymer may include the first structural unit and the second structural unit at a mole ratio of about 1:99 to about 99:1.

The copolymer may have a number average molecular weight of about 5000 to about 100,000.

The copolymer may have a solubility in water of greater than or equal to about 100 g/L at a temperature of less than a lower critical solution temperature (LCST). Conversely, the copolymer may have a solubility in water of less than or equal to about 1 g/L at a temperature of greater than or equal to the lower critical solution temperature (LCST).

The lower critical solution temperature (LCST) may be about 10 to about 50° C.

The temperature-sensitive side chain of the copolymer may form a hydrogen bond with water at a temperature of less than the lower critical solution temperature (LCST). On the other hand, the temperature-sensitive side chains may form a hydrogen bond therebetween so as to be reversibly self-agglomerated at a temperature of greater than or equal to the lower critical solution temperature (LCST).

A particle size of the copolymer of greater than or equal to about 50 wt % of the total draw solute may be increased by about 10 to about 10,000 times from a temperature below to one above the lower critical solution temperature (LCST).

According to another non-limiting embodiment, a forward osmosis water treatment device may include a feed solution including subject materials to be separated for purification; an osmosis draw solution including the draw solute for forward osmosis; a semi-permeable membrane contacting the feed solution on one side and the osmosis draw solution on the other side; a recovery system configured to separate and recover the draw solute of the osmosis draw solution; and a connector configured to reintroduce the draw solute of the osmosis draw solution that is recovered by the recovery system into the osmosis draw solution contacting the semi-permeable membrane.

The forward osmosis water treatment device may further include an outlet configured to produce treated water from the rest of the osmosis draw solution after the draw solute is separated by the recovery system, which includes water that has passed through the semi-permeable membrane from the feed solution by osmotic pressure.

The recovery system may include a temperature controller to heat the draw solute to greater than or equal to a lower critical solution temperature (LCST) so as to reversibly agglomerate the draw solute.

The connector may include a temperature controller to cool the recovered draw solute to less than the lower critical solution temperature (LCST) so as to disassemble the agglomeration of the recovered draw solute.

The recovery system may include a microfiltration (MF) membrane, an ultrafiltration (UF) membrane, a nanofiltration (NF) membrane, or a centrifuge.

According to yet another non-limiting embodiment, a forward osmosis method for water treatment may include contacting a feed solution including subject materials to be separated for purification and an osmosis draw solution including the draw solute for forward osmosis with a semi-permeable membrane positioned therebetween, so that water in the feed solution passes through the semi-permeable membrane by osmotic pressure and moves to the osmosis draw solution having a lower osmotic pressure concentration than a feed solution; heating the osmosis draw solution (which includes water that has passed through the semi-permeable membrane and has moved to the osmosis draw solution) to a temperature above a lower critical solution temperature (LCST) so that a draw solute in the osmosis draw solution is reversibly self-agglomerated; separating and recovering the reversibly self-agglomerated draw solute from the osmosis draw solution (which includes the water that has passed through the semi-permeable membrane and moved to the osmosis draw solution); and producing treated water from the rest of the osmosis draw solution including the water that has passed through the semi-permeable membrane and moved to the osmosis draw solution and from which the reversibly self-agglomerated draw solute has been removed.

The forward osmosis method for water treatment may further include cooling the recovered draw solute to a temperature below the lower critical solution temperature (LCST) so as to disassemble the agglomerated draw solute and reintroduce it into the osmosis draw solution contacting the semi-permeable membrane.

DETAILED DESCRIPTION

This disclosure will be described more fully hereinafter in the following detailed description, in which various example embodiments are described. This disclosure may be embodied in many different forms and should not be construed as limited to the embodiments set forth herein.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, when a definition is not otherwise provided, the term "substituted" may refer to one substituted with a hydroxy group, a nitro group; a cyano group, an imino group (=NH or =NR', where R' is a C1 to C10 alkyl group), an amino group (—NH2, —NH(R'' or —N(R'')(R'''), where R'' to R''' are each independently a C1 to C10 alkyl group), an amidino group, a hydrazine group, a hydrazone group, a carboxyl group, a C1 to C30 alkyl group, a C1 to C10 alkylsilyl group, a C3 to C30 cycloalkyl group, a C6 to C30 aryl group, a C2 to C30 heteroaryl group, a C1 to C10 alkoxy group, a halogen, a C1 to C10 fluoroalkyl group such as a trifluoromethyl group, and the like.

As used herein, when a definition is not otherwise provided, the prefix "hetero" may refer to one including 1 to 3 heteroatoms selected from N, O, S, and P, with the remaining structural atoms being carbons in a compound or a substituent.

As used herein, when a definition is not otherwise provided, the term "combination thereof" refers to at least two substituents bound to each other by a linker, or at least two substituents condensed to each other.

As used herein, "*" may refer to an attachment point to the same or different atom or chemical formula.

As used herein, when a definition is not otherwise provided, the term "alkyl group" may refer to a "saturated alkyl group" without an alkenyl or alkynyl, or an "unsaturated alkyl group" without at least one alkenyl or alkynyl. The "alkenyl group" may refer to a substituent in which at least two carbon atoms are bound in at least one carbon-carbon double bond, and the term "alkyne group" refers to a substituent in which at least two carbon atoms are bound in at least one carbon-carbon triple bond.

The alkyl group may be a C1 to C30 linear or branched alkyl group, and more specifically a C1 to C6 alkyl group, a C7 to C10 alkyl group, or a C11 to C20 alkyl group.

For example, a C1-C4 alkyl may have 1 to 4 carbon atoms, and may be selected from the group consisting of methyl, ethyl, propyl, iso-propyl, n-butyl, iso-butyl, sec-butyl, and t-butyl.

Examples of the alkyl group include a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, a cyclohexyl group, and the like.

The term "aromatic group" may refer to a substituent including a cyclic structure where all elements have p-orbitals which form conjugation. An aryl group and a heteroaryl group may be suitable aromatic groups.

The term "aryl group" may refer to monocyclic or fused ring-containing polycyclic (i.e., rings sharing adjacent pairs of carbon atoms) groups.

The "heteroaryl group" may refer to one including 1 to 3 heteroatoms selected from N, O, S, or P in an aryl group, with the remaining structural atoms being carbons. When the heteroaryl group is a fused ring, each ring may include 1 to 3 heteroatoms.

The draw solute for forward osmosis according to a non-limiting embodiment may include a copolymer including a first structural unit to which a temperature-sensitive side chain is graft polymerized, and a second structural unit including a hydrophilic functional group. The temperature-sensitive side chain may include a structural unit for a side chain. The structural unit for the side chain may include a temperature-sensitive moiety.

The temperature-sensitive moiety may be a monovalent substituent represented by the following Chemical Formula 1, a monovalent substituent represented by the following Chemical Formula 2, or a divalent substituent represented by the following Chemical Formula 3:

[Chemical Formula 1]

wherein, in the above Chemical Formula 1,
$R^1$ and $R^2$ are each independently hydrogen or a linear or branched C3 to C5 alkyl group, provided that at least one of $R^1$ and $R^2$ is not hydrogen,

[Chemical Formula 2]

wherein, in the above Chemical Formula 2,
$R^3$ is a C3 to C5 alkylene group, and

[Chemical Formula 3]

wherein, in the above Chemical Formula 3,
$R^4$ is a linear or branched C3 to C5 alkyl group.

The draw solute for forward osmosis is used in a forward osmosis water treatment process. The forward osmosis water treatment process allows water molecules to move from a feed solution to the osmosis draw solution by using an osmosis draw solution having a higher solute concentration than the feed solution, and then separates a draw solute from the osmosis draw solution, reuses it, and produces fresh water.

The forward osmosis draw solute lowers energy cost required in the separation and recovery of the draw solution during the forward osmosis process. The forward draw solute for forward osmosis may include a copolymer including a first structural group introduced with a temperature-sensitive side chain of which the hydrophilicity is controlled by temperature, and a second structural unit including a hydrophilic functional group, so as to separate and recover the draw solute with relative ease.

The copolymer decreases in hydrophilicity with increasing temperature. For instance, the copolymer is reversibly self-agglomerated, exhibits decreased solubility in water, and becomes dissoluble at higher temperatures. The copolymer which is reversibly self-agglomerated at a higher temperature increases in particle size so as to permit a relatively easy separation from the osmosis draw solution. For example, the copolymer may be relatively easily separated from water since the temperature-sensitive side chain is agglomerated by the intermolecular hydrophobic interaction at a temperature of higher than or equal to a temperature for generating a precipitate.

The copolymer formed in dissoluble particles having an increased size is relatively easily separated by a microfiltration (MF) membrane, an ultrafiltration (UF) membrane, a nanofiltration (NF) membrane, or a centrifuge without consuming an excessive amount of energy.

The copolymer may be dissolved in water at a relatively high concentration due to higher hydrophilicity at a lower temperature to provide an osmosis draw solution having a relatively high concentration, so as to increase the osmotic pressure.

The copolymer has temperature-sensitive characteristics mentioned above by introducing the temperature-sensitive side chain, and the term "temperature-sensitive" refers to a characteristic of being reversibly self-agglomerated as temperature increases since the difference in solubility in water may be substantial between a higher temperature and a lower temperature.

The term "lower critical solution temperature (LCST)" refers to the lowest temperature at which the temperature-sensitive copolymer may be separated from a solution (the highest temperature of being well-dissolved in water). The lower critical solution temperature of the copolymer may range from about 10 to about 50° C., for example, from about 25 to about 45° C., particularly, from about 30 to about 40° C.

The copolymer has a relatively high hydrophilicity at a temperature of less than the lower critical solution temperature (LCST), so the temperature-sensitive side chain may form a hydrogen bond with water so as to be dissolved in water. On the other hand, the copolymer exhibits a lower hydrophilicity at a temperature of greater than or equal to the lower critical solution temperature (LCST) and forms a hydrogen bond between the temperature-sensitive side chains, so that the copolymer precipitates as a reversibly self-agglomerated particle.

By providing the reversible self-agglomeration as mentioned above, the copolymer may change in solubility in water around the lower critical solution temperature (LCST).

As the copolymer is hydrophilic at a temperature of less than the lower critical solution temperature (LCST), the solubility in water is relatively high, which is adequate to be applied for the osmosis draw solution having a relatively high concentration. Conversely, as the copolymer is hydrophobic at a temperature of greater than or equal to the lower critical solution temperature (LCST), it is reversibly self-agglomerated and precipitates so as to be relatively easily separated from the osmosis draw solution. It is also relatively easy to reuse the separated copolymer for the osmosis draw solution by cooling the separated copolymer at a temperature of less than the lower critical solution temperature (LCST) so as to be hydrophilic again.

The copolymer may have a solubility in water of greater than or equal to about 100 g/L at a temperature of less than the lower critical solution temperature (LCST). On the other hand, the copolymer may have a solubility in water of less than or equal to about 1 g/L at a temperature of greater than or equal to the lower critical solution temperature (LCST). For example, the copolymer may have a solubility in water of about 200 g/L to about 800 g/L at a temperature of less than the lower critical solution temperature (LCST), and a solubility in water of about 0.1 g/L to about 10 g/L at a temperature of greater than or equal to the lower critical solution temperature (LCST). Particularly, the copolymer may have a solubility in water of about 500 g/L to about 800 g/L at a temperature of less than the lower critical solution temperature (LCST), and a solubility in water of about 0.1 g/L to about 1 g/L at a temperature of greater than or equal to the lower critical solution temperature (LCST).

According to a non-limiting embodiment, the main chain of the copolymer may include a structural unit derived from one selected from a vinyl-based compound, a cyclic imide represented by $R(CO)_2NH$ (where R is a C2 to C6 alkylene group), and a combination thereof. In an example, the cyclic imide may be succinimide. The main chain may be a main chain of the first structural unit (e.g., first main chain) or a main chain of the second structural unit (e.g., second main chain).

For example, the first structural unit may be provided by linking the temperature-sensitive side chain to a succinimide-derived structural unit. In this case, the temperature-sensitive side chain may be linked to the carbon atom or nitrogen atom forming the main chain of the polymer.

The temperature-sensitive side chain may be connected to the main chain through a linking group. The linking group may be a linking group derived from the compound which may be used in the synthesis process in order to connect the temperature-sensitive side chain to the main chain.

The structural unit for the side chain including a temperature-sensitive moiety may be a structural unit represented by the following Chemical Formula 4, a structural unit represented by the following Chemical Formula 5, or a structural unit represented by the following Chemical Formula 6:

[Chemical Formula 4]

[Chemical Formula 5]

[Chemical Formula 6]

wherein, in Chemical Formulas 4 to 6,
$R^5$ and $R^6$ are each independently a linear or branched C3 to C5 alkyl group, and
$R^7$ is a C3 to C5 alkylene group.

The temperature-sensitive side chain may include one selected from the structural unit represented by Chemical Formula 4, the structural unit represented by Chemical Formula 5, the structural unit represented by Chemical Formula 6, and a combination thereof.

For example, the temperature-sensitive side chain may include n of the structural unit represented by Chemical Formula 4, the structural unit represented by Chemical Formula 5, or the structural unit represented by Chemical Formula 6, wherein n may be an integer from 2 to 30. For instance, n may range from 2 to 8, and more specifically from 4 to 6.

The structural unit for the side chain including a temperature-sensitive moiety may be, for example, a structural unit derived from N-isopropylacrylamide (NIPAM), N,N-diethylacrylamide (DEAAM), N-vinylcaprolactam (VCL), and a combination thereof.

The hydrophilic functional group of the second structural unit may include, for example, one selected from hydrogen, a hydroxy group, an amide group, and a combination thereof at its terminal end.

The second structural unit may include a second main chain and a second side chain. The hydrophilic functional group may be substituted in a main chain (e.g., second main chain) or a side chain (e.g., second side chain) of the second structural unit. When the hydrophilic functional group is introduced to the second main chain, a hydrogen connected to the second main chain may be substituted. Alternatively, the hydrophilic functional group, which is divalent, may form a part of the second main chain. When the hydrophilic functional group is introduced to the second side chain, the hydrophilic functional group may replace a hydrogen contained in the second side chain. Alternatively, the hydrophilic functional group, which is divalent, may form a part of the second side chain.

In a non-limiting embodiment, the second structural unit may be a structural unit derived from succinimide having a hydrophilic functional group. The second structural unit may include, for example, polyhydroxyethylaspartamide (PHEA), polyasparagine, polyhydroxyethylacrylate, polymethylmethacrylate, polymethylacrylate, polymethacrylate, or the like.

The copolymer may have a number average molecular weight of about 5000 to about 100,000. For example, the copolymer may have a number average molecular weight of about 10,000 to about 50,000, and particularly, the copolymer may have a number average molecular weight of about 10,000 to about 35,000. The copolymer having the ranged molecular weight is used for a draw solute for forward osmosis to provide an osmosis draw solution having a relatively high concentration at a temperature of less than the lower critical solution temperature (LCST).

The copolymer may include the first structural unit and the second structural unit at a mole ratio of about 1:99 to about 99:1. For example, the copolymer may include the first structural unit and the second structural unit at a weight ratio of about 1:99 to about 70:30, and particularly, the copolymer may include the first structural unit and the second structural unit at a weight ratio of about 5:95 to about 50:50. When the amount ratio is within the above ranges, the copolymer may have the desired temperature-sensitive characteristics and also the solubility to provide a sufficient concentration that accomplishes an osmotic pressure.

The copolymer may be one selected from a block copolymer, an alternating copolymer, a random copolymer, a graft copolymer, and a combination thereof that include the first structural unit and the second structural unit.

Since the copolymer is reversibly self-agglomerated at a temperature of greater than or equal to the lower critical solution temperature (LCST), the particle size of the copolymer increases relatively rapidly at a temperature of greater than or equal to the lower critical solution temperature (LCST) relative to the temperature of less than the lower critical solution temperature (LCST). The particle sizes of the copolymers of about 50 wt % or more of the total draw solute may increase by about 10 times to about 10,000 times from a temperature below to one above the lower critical solution temperature (LCST). Specifically, the particle sizes of the copolymers of about 50% or more of the total draw solute may increase by about 100 to about 10,000 times from a temperature below to one above the lower critical solution temperature (LCST), and more specifically, the particle sizes of the copolymers of about 50% or more of the total draw solute may increase by about 1000 to about 10,000 times. A change in the particle size may be measured from the increase of the particle size by about 10 times to about 10,000 times when the hydraulic radius is measured by dynamic light scattering.

The copolymer having an increased particle size, which is a copolymer particle at a temperature of greater than or equal to the lower critical solution temperature (LCST), has a hydraulic radius of, for example, about 100 nm to about 10,000 nm. Particularly, the copolymer particle may have a hydraulic radius of about 300 nm to about 50 μm at a temperature of greater than or equal to the lower critical solution temperature (LCST). For example, the copolymer particle may have a hydraulic radius of about 300 nm to about 5 μm at a temperature of greater than or equal to the lower critical solution temperature (LCST).

According to another non-limiting embodiment, a forward osmosis water treatment device using the forward osmosis draw solute is provided.

The forward osmosis water treatment device may include a feed solution including subject materials to be separated for purification; an osmosis draw solution including the draw solute for forward osmosis; a semi-permeable membrane contacting the feed solution at one side and the osmosis draw solution at the other side; a recovery system for separating and recovering the draw solute of the osmosis draw solution; and a connector for reintroducing the draw solute of the osmosis draw solution that is recovered by the recovery system into the osmosis draw solution contacting the semi-permeable membrane.

The semi-permeable membrane is a semi-permeable separation layer for forward osmosis which is permeable for water and non-permeable for the subject materials to be separated.

The detailed description of the draw solute for forward osmosis may be as described above.

The concentration of the osmosis draw solution may be controlled to provide a higher osmotic pressure than treated water. According to a non-limiting embodiment, the osmosis draw solution including the draw solute at a concentration of about 10 wt % may provide an osmotic pressure of about 50 atm. According to another non-limiting embodiment, the osmosis draw solution including the draw solute at a concentration of about 20 wt % may provide an osmotic pressure of about 100 atm. The proper concentration of draw solute in the osmosis draw solution will depend on the concentration and the nature of the feed solution as well as the operating conditions. For example, with regard to the desalination of sea water, the osmosis pressure may be at least 26 atm. In a non-limiting embodiment, the osmosis pressure may be 50 atm or more. Thus, the concentration of the draw solute in the osmosis draw solution may be at least 5 wt %. For instance, the concentration of the draw solute in the osmosis draw solution may be 10 wt % or more. With regard to purifying waste water, less osmosis pressure may be involved compared to desalination, e.g., 10-20 atm or less. Thus, to purify waste water, the concentration of the draw solute in the osmosis draw solution may be about 1-2 wt %.

The forward osmosis water treatment device may further include an outlet for producing treated water from the rest of the osmosis draw solution after the draw solute is separated therefrom by the recovery system. The treated water includes water that has passed through the semi-permeable membrane from the feed solution by osmotic pressure.

According to the operation mechanism of the forward osmosis water treatment device, the water in the feed solution to be treated passes through the semi-permeable membrane and moves to the osmosis draw solution of higher solute concentration by osmotic pressure; the osmosis draw solution including the water from the feed solution moves to the recovery system; the draw solute for forward osmosis is separated; and the rest of the osmosis draw solution after the draw solute is separated by the recovery system is output by the outlet and obtained as treated water. The separated draw solute for forward osmosis may be reused by reintroducing it into the osmosis draw solution contacting the feed solution to be treated and having the semi-permeable membrane in between.

In the recovery system, the draw solute for forward osmosis may be separated and recovered by taking advantage of the temperature-sensitive characteristics of the copolymer as described above. In other words, the recovery system may include a temperature controller, so the copolymer may be reversibly self-agglomerated by being heated to a temperature of greater than or equal to the lower critical solution temperature (LCST) for the particle size of the draw solute to increase, and filtered so as to be separated.

The filtration may involve the use of a microfiltration (MF) membrane, an ultra filtration (UF) membrane, a nanofiltration (NF) membrane, a centrifuge, or the like. Since a block copolymer forming a micellar network of a microsize may be filtered and separated using a microfiltration membrane, the recovery system may reduce operation energy use.

In order to add and reuse the separated and recovered draw solute of the copolymer into the osmosis draw solution contacting the feed solution, the draw solute needs to be cooled to a temperature of less than the lower critical solution temperature (LCST) for the solubility of the draw solute to increase so as to allow dissolution in the osmosis draw solution. Accordingly, the connector may include a temperature controller for cooling to a temperature of less than the lower critical solution temperature (LCST). By using the temperature controller, the agglomerated draw solute may be disassembled by cooling the recovered draw solute to a temperature of less than the lower critical solution temperature (LCST). The cooled draw solute may then be reintroduced into the osmosis draw solution contacting the semi-permeable membrane.

When the copolymer is used as a draw solute for forward osmosis, the forward osmosis process is performed at a temperature of less than or equal to the lower critical solution temperature (LCST), and the draw solute is relatively easily separated and recovered by controlling the temperature to greater than or equal to the lower critical solution temperature (LCST) in the recovery system. In addition, the copolymer may have the lower critical solution temperature (LCST) of about 10 to about 50° C. which is relatively low, so a relatively high temperature condition is not required when recovering the draw solute, which is beneficial in the view of operation energy reduction.

The forward osmosis water treatment device has the ability of reusing the draw solute recovered by controlling the temperature as described above.

The feed solution may be sea water, brackish water, ground water, waste water, and the like. For example, sea water may be purified with the forward osmosis water treatment device to obtain drinking water.

In yet another non-limiting embodiment, a forward osmosis method for water treatment may include contacting a feed solution including subject materials to be separated for purification and an osmosis draw solution including the draw solute for forward osmosis with a semi-permeable membrane positioned therebetween, so that water in the feed solution passes through the semi-permeable membrane by osmotic pressure and moves to the osmosis draw solution having a lower osmotic pressure concentration than the feed solution; heating the osmosis draw solution including the water that passed through the semi-permeable membrane and into the osmosis draw solution to a temperature above the lower critical solution temperature (LCST) so that the draw solute in the osmosis draw solution is reversibly self-agglomerated; separating and recovering the reversibly self-agglomerated draw solute from the osmosis draw solution (which includes the water that passed through the semi-permeable membrane and into the osmosis draw solution); and producing treated water from the rest of the osmosis draw solution (which includes the water that passed through the semi-permeable membrane and into the osmosis draw solution) from which the reversibly self-agglomerated draw solute has been removed.

The detailed description of the draw solute for forward osmosis may be as described above.

The forward osmosis method for water treatment may further include cooling the recovered draw solute to a temperature below the lower critical solution temperature (LCST) so as to disassemble the agglomerated draw solute and reintroduce it into the osmosis draw solution contacting the semi-permeable membrane.

The lower critical solution temperature (LCST) may range from about 10 to about 50° C. as mentioned above.

Figure 1:
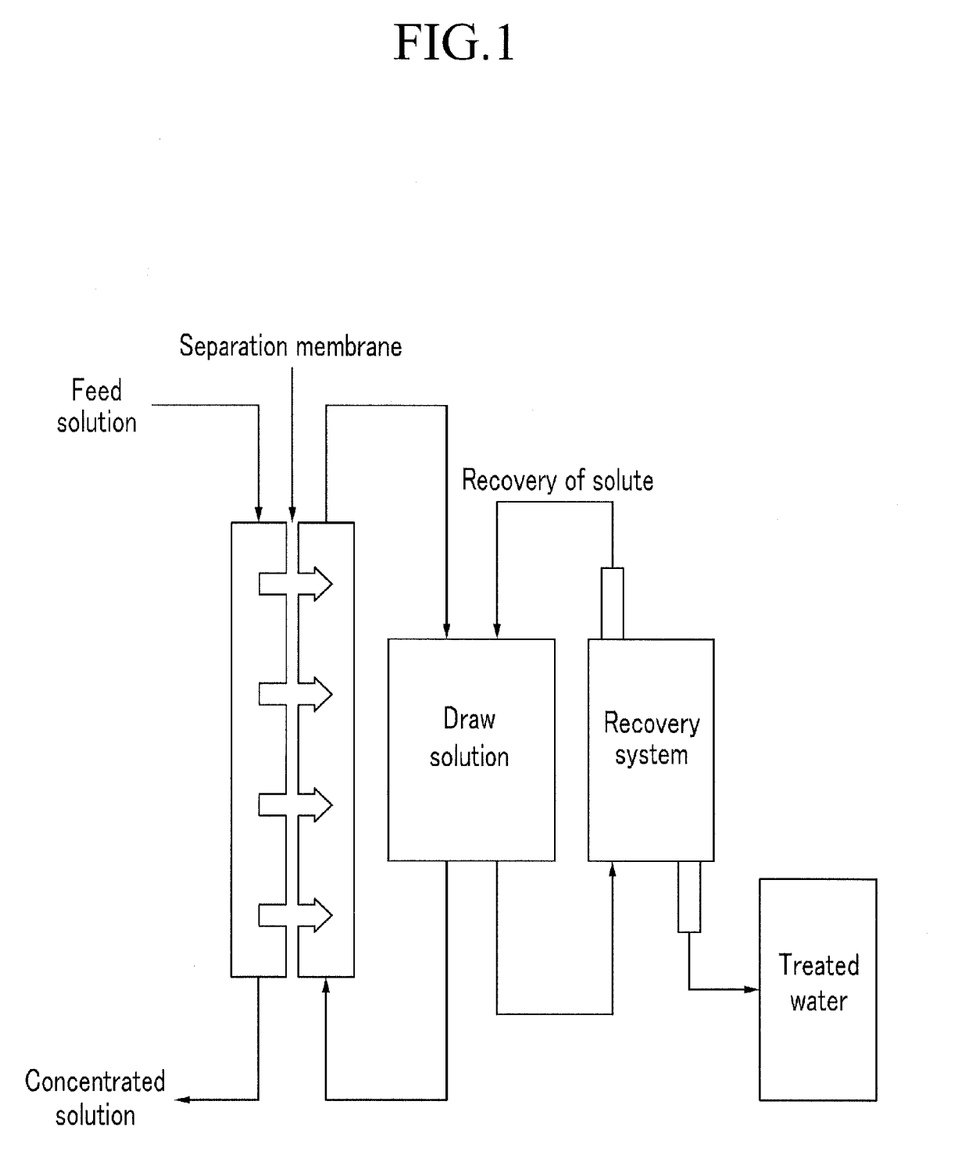
FIG. 1 is a schematic view of a forward osmosis water treatment device according to a non-limiting embodiment.

FIG. 1 is a schematic view of a forward osmosis water treatment device that may be operated according to the forward osmosis method for water treatment.

EXAMPLE

Example 1

1) Synthesis of NIPAAm Oligomer

A NIPAAm (N-isopropylacrylamide) oligomer represented by the following Chemical Formula 7 is synthesized according to radical polymerization. 6 g (0.053 mol) of a purified NIPAAm monomer, 0.1897 g (0.0016 mol) of a chain transfer agent of aminoethanethiol hydrochloride (AET-HCl), 0.087 g (0.001 mol) of azobisisobutyronitrile (AIBN), and 31.34 mL of dimethylformamide (DMF) are reacted in a 3-neck round-bottom flask at 75° C. under a nitrogen condition for 15 hours. A polymerized NIPAAm oligomer is purified with diethylether and dried in a vacuum oven for one day. In order to remove HCl of the polymerized oligomer terminal end, triethylamine is added in an amount of two times the mole ratio of the NIPAAm oligomer and reacted for 24 hours, and then purified with diethylether and dried in a vacuum oven for one day.

[Chemical Formula 7]

In the above Chemical Formula 7, n refers to a polymerization degree.

2) Synthesis of PSi-g-oligo NIPAAm 0.4 g of polysuccinimide and 0.27 g of the NIPAAm oligomer are dissolved in 3.35 ml of a DMF solvent and reacted at 70° C. for 48 hours.

3) Synthesis of PSi-g-oligo NIPAAm-PHEA

PSi-g-oligo NIPAAm-PHEA represented by the following Chemical Formula 8 is synthesized.

[Chemical Formula 8]

In the above Chemical Formula 8,
R is

R' is —$CH_2$—$CH_2$—OH, and
m and n refer to a polymerization degree.

1.675 ml of the synthesized PSi-g-oligo NIPAAm is added into 0.137 ml of ethanol amine and reacted at 50° C. for 6 hours. The synthesized PSi-g-oligo NIPAAm-PHEA is introduced into a dialysis tube and purified for 2 days and then lyophilized.

The synthesized PSi-g-oligo NIPAAm-PHEA has m:n=10:90 in Chemical Formula 8.

Figure 2:
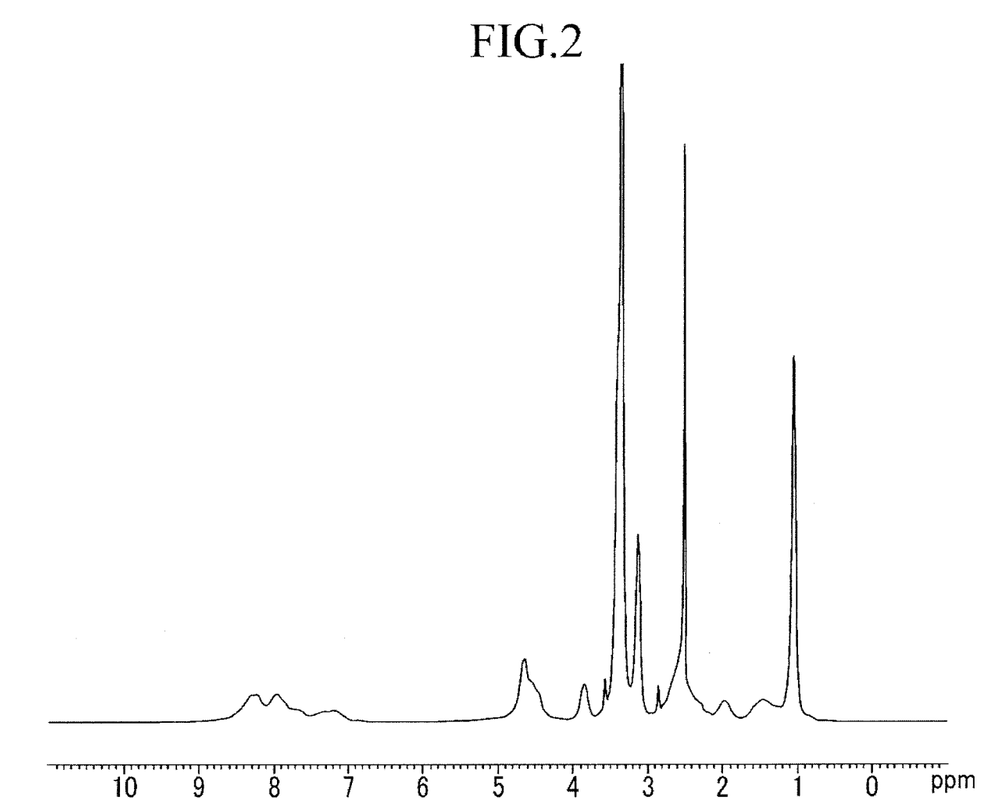
FIG. 2 shows a nuclear magnetic resonance (NMR) analysis spectrum of the synthesized copolymer in Example 1.

FIG. 2 shows an $H^1$-NMR analysis spectrum of the synthesized copolymer of Example 1, PSi-g-oligo NIPAAm-PHEA.

Example 2

The PNIPAAm oligomer obtained from Example 1 is grafted to polysuccinimide while changing the substitution degree. 0.4 g of polysuccinimide and 1.08 g of a NIPAAm oligomer are dissolved in 7.4 ml of a DMF solvent and reacted at 70° C. for 48 hours to provide PSi-g-oligo NIPAAm (DS40). 3.7 mL of the prepared PSi-g-oligo NIPAAm (DS40) is reacted with 0.137 mL of ethanolamine, then purified and dried. The PSi-g-oligo NIPAAm-PHEA obtained from Example 2 has m:n=40:60 in Chemical Formula 8.

Figure 3:
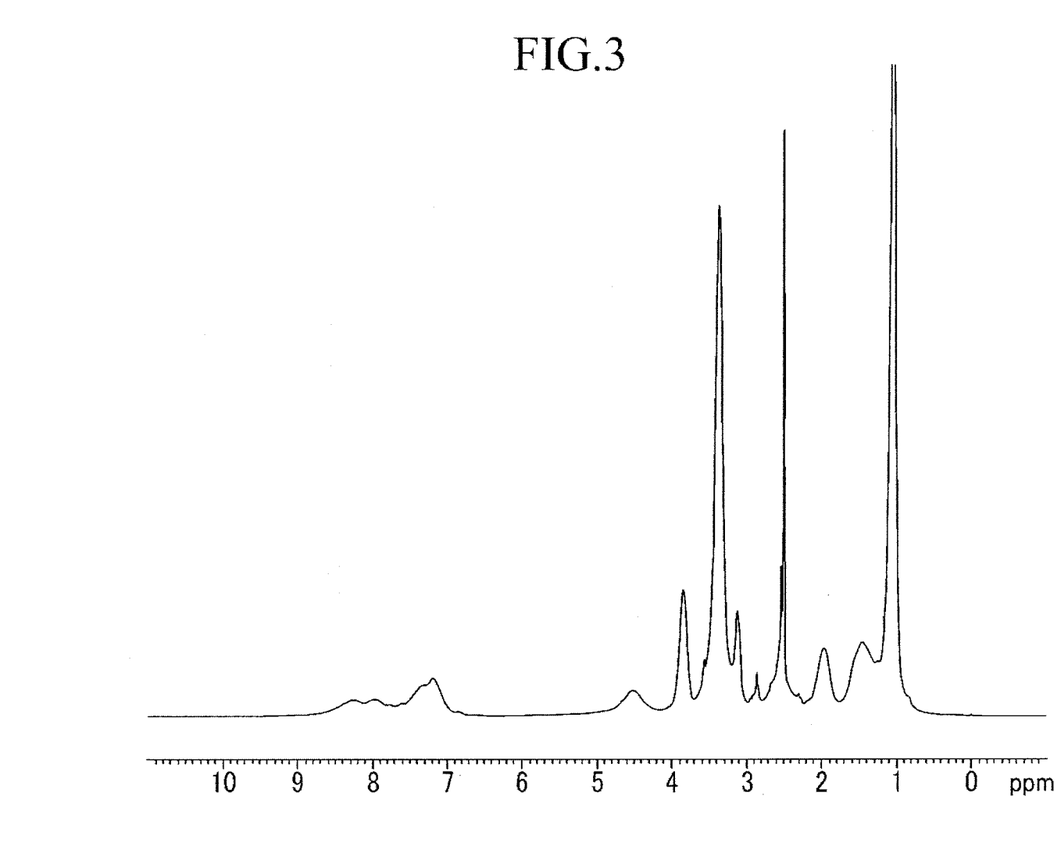
FIG. 3 shows a nuclear magnetic resonance (NMR) analysis spectrum of the synthesized copolymer in Example 2.

FIG. 3 shows an $H^1$-NMR analysis spectrum of the synthesized copolymer of Example 2, PSi-g-oligo NIPAAm-PHEA.

Comparative Example 1

The NIPAAm (N-isopropylacrylamide) mono-molecule compound is prepared.

Experimental Example 1

Assessment of Molecular Weight

From the results of the $H^1$-NMR spectrum of the synthesized copolymers, each substitution degree may be calculated. For the first structural unit, Example 1 has a substitution degree of 6.3 mol % and Example 2 has one of 33 mol %. Since the polymerization degree for the polysuccinimide main chain used for the synthesis is 133.8, Example 1 has a number average molecular weight of the copolymer of 23,000, and Example 2 has one of 30,000.

Experimental Example 2

Preparation of Osmosis Draw Solution and Analysis of Osmotic Pressure

As shown in the following Table 1, the osmosis draw solutions having the various concentrations are prepared, and the osmosis draw solutions including copolymers prepared from Examples 1 and 2 are analyzed for osmotic pressure using an osmotic pressure measurer (Osmomat090, Gonotek) according to the membrane measuring method.

TABLE 1

|  | Number average molecular weight | Concentration [wt %] | Osmotic pressure (atm) |
| --- | --- | --- | --- |
| Example 1 | 23,000 | 0.1 | 0.353 |
|  |  | 0.2 | 0.863 |
|  |  | 0.5 | 2.353 |
| Example 2 | 30,000 | 0.25 | 0.289 |
|  |  | 0.5 | 0.639 |
|  |  | 1.0 | 1.719 |
| Comparative Example 1 | 113.6 | 10 | 18 |

Experimental Example 3

Assessment of Solubility of Osmosis Draw Solution

Figure 4:
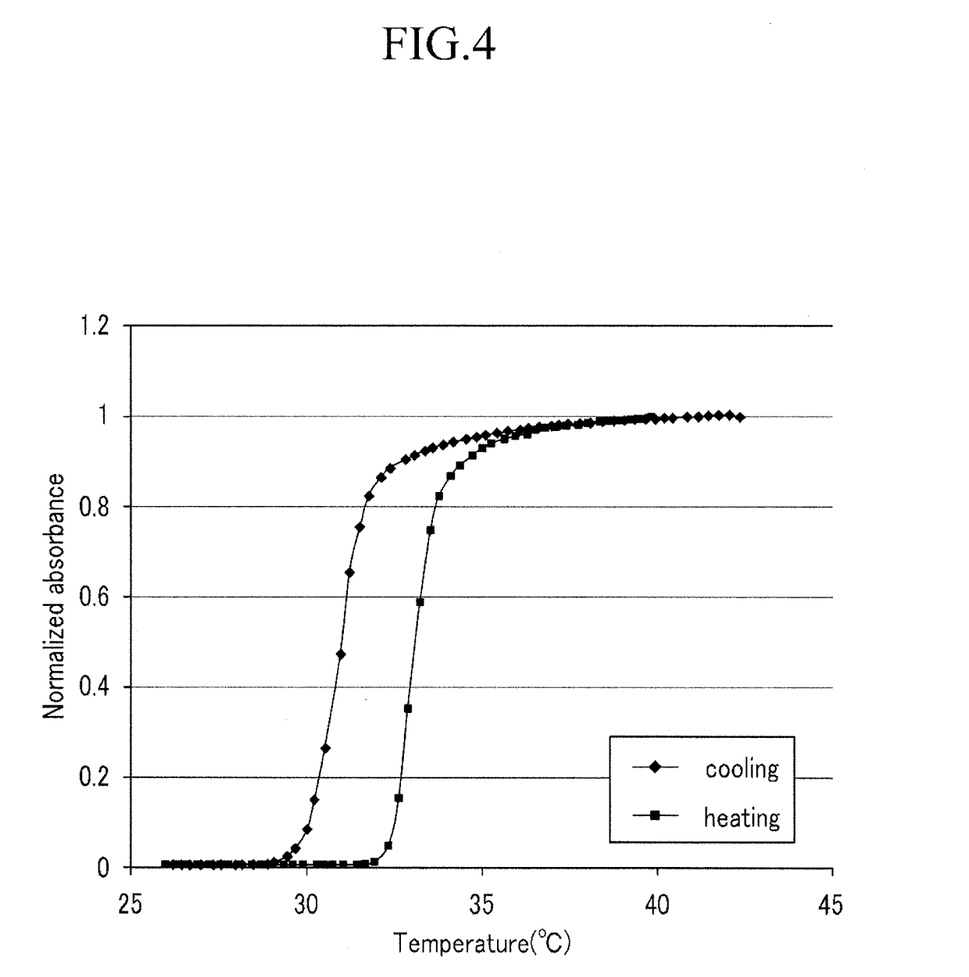
FIG. 4 shows solubility according to temperature of an osmosis draw solution using the copolymer synthesized in Example 1.
Figure 5:
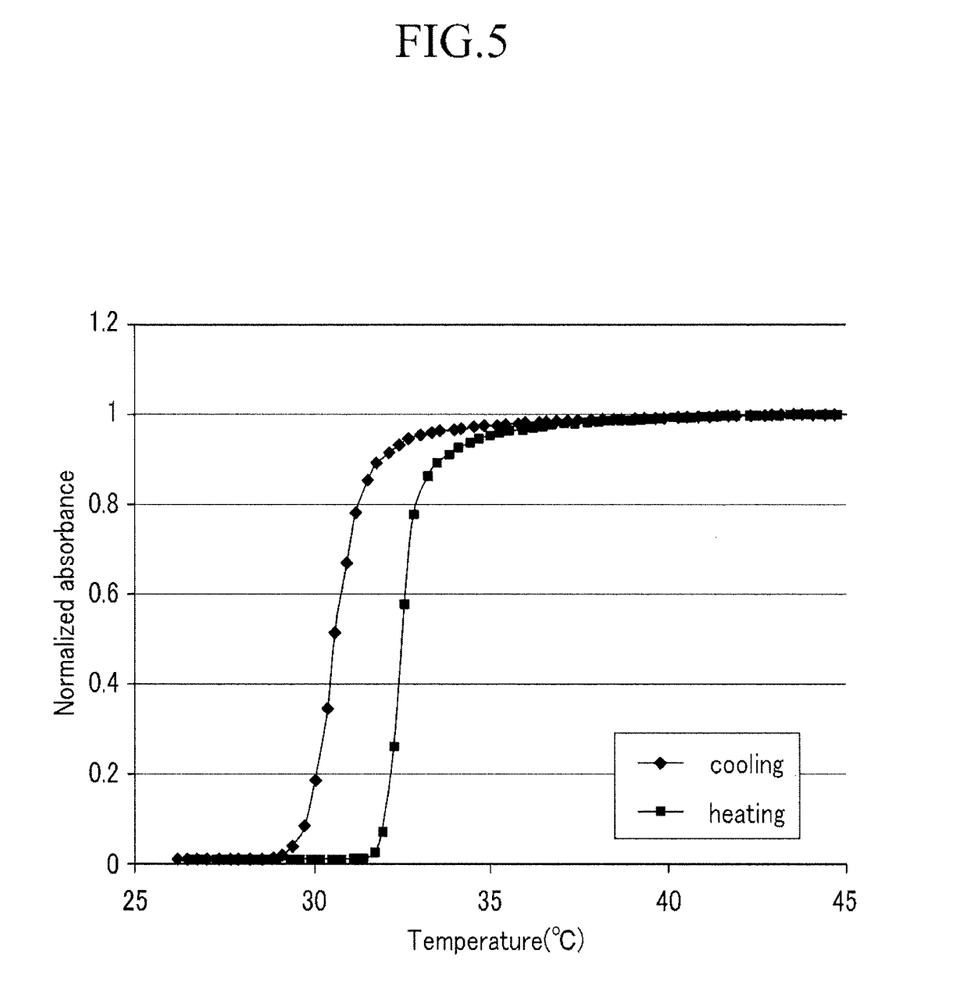
FIG. 5 shows solubility according to temperature of an osmosis draw solution using the copolymer synthesized in Example 2.

While slowly heating the osmosis draw solutions including 1 wt % of copolymers obtained from Example 1 and Example 2 from room temperature, and then cooling the same back to room temperature, the solubility change of the solution is monitored according to temperature by measuring the absorbance. FIG. 4 shows a solubility graph of the osmosis draw solution including the copolymer according to Example 1 depending upon temperature, and FIG. 5 shows a solubility graph of the osmosis draw solution including the copolymer according to Example 2 depending upon temperature. The temperature at which the solution starts to whiten when increasing the temperature is set as the "lower critical solution temperature (LCST)." The results are shown in the following Table 2.

TABLE 2

|  | Example 1 | Example 2 | Comparative Example 1 |
| --- | --- | --- | --- |
| LCST (° C.) | 32-33° C. | 32-33° C. | 36-37° C. |
| 0.2 μm filter separation | Separated | Separated | Opaque at 60° C. Not precipitated. Not separated by 0.2 μm filter |
| Reversibility (@25° C.) | ○ | ○ | ○ |

It is observed that absorbance is remarkably increased around 32° C. when heating both Example 1 and Example 2 (meaning that it is self-agglomerated), and absorbance is remarkably decreased around 30° C. (meaning that is re-dissolved). A temperature difference of about 2-3° C. is observed in the analysis results on heating and cooling since the temperature distribution inside the cell is not uniform because the measuring solution is not uniformly agitated due to the analysis equipment structure.

While this disclosure has been described in connection with what is presently considered to be various example embodiments, it is to be understood that the disclosure is not limited to the disclosed embodiments, but, on the contrary, is intended to cover various modifications and equivalent arrangements included within the spirit and scope of the appended claims.

What is claimed is:

1. A draw solute for forward osmosis, the draw solute comprising:
a copolymer including a first structural unit and a second structural unit at a mole ratio of about 1:99 to about 10:90 of the first structural unit to the second structural unit and has a lower critical solution temperature (LCST) of about 25 to about 50° C. in water, the first structural unit including a first main chain and a first side chain, the second structural unit including a second main chain and a second side chain, the first main chain and the second main chain being directly linked to form a main chain for the copolymer, the first side chain being a temperature-sensitive side chain graft polymerized to the first main chain, the temperature-sensitive side chain including at least one side structural unit, the at least one side structural unit including a temperature-sensitive moiety, the second structural unit including a hydrophilic functional group substituted in the second main chain or the second side chain of the second structural unit, the temperature-sensitive moiety being a monovalent substituent represented by the following Chemical Formula 1, a monovalent substituent represented by the following Chemical Formula 2, or a divalent substituent represented by the following Chemical Formula 3:

[Chemical Formula 1]

wherein, in the above Chemical Formula 1,
$R^1$ and $R^2$ are each independently hydrogen or a linear or branched C3 to C5 alkyl group, provided that $R^1$ and $R^2$ are not simultaneously hydrogen,

[Chemical Formula 2]

wherein, in the above Chemical Formula 2,
$R^3$ is a C3 to C5 alkylene group, and

[Chemical Formula 3]

wherein, in the above Chemical Formula 3,
$R^4$ is a linear or branched C3 to C5 alkyl group,
wherein the at least one side structural unit is represented by the following Chemical Formula 4, Chemical Formula 5, Chemical Formula 6, or a combination thereof:

[Chemical Formula 4]

[Chemical Formula 5]

[Chemical Formula 6]

wherein, in Chemical Formulas 4 to 6,
$R^5$ and $R^6$ are each independently a linear or branched C3 to C5 alkyl group, and
$R^7$ is a C3 to C5 alkylene group, and
wherein the temperature-sensitive side chain includes n of Chemical Formula 4, Chemical Formula 5, or Chemical Formula 6, n being an integer ranging from 2 to 30.

2. The draw solute for forward osmosis of claim 1, wherein at least one of the first main chain and the second structural unit is derived from one selected from the group consisting of a vinyl-based compound, a cyclic imide represented by $R(CO)_2NH$ (where R is a C2 to C6 alkylene group), and a combination thereof.

3. The draw solute for forward osmosis of claim 1, wherein the at least one side structural unit is derived from one selected from the group consisting of N-isopropylacrylamide (NIPAM), N,N-diethylacrylamide (DEAAM), N-vinylcaprolactam (VCL), and a combination thereof.

4. The draw solute for forward osmosis of claim 1, wherein the hydrophilic functional group includes one selected from the group consisting of hydrogen, a hydroxy group, an amide group, and a combination thereof.

5. The draw solute for forward osmosis of claim 1, wherein the copolymer has a number average molecular weight of about 5000 to about 100,000.

6. The draw solute for forward osmosis of claim 1, wherein the copolymer has a first solubility in water of greater than or equal to about 100 g/L at a first temperature of less than a lower critical solution temperature (LCST), and a second solubility in water of less than or equal to about 1 g/L at a second temperature of greater than or equal to the lower critical solution temperature (LCST).

7. The draw solute for forward osmosis of claim 1, wherein the temperature-sensitive side chain of the copolymer forms a hydrogen bond with water at a first temperature of less than a lower critical solution temperature (LCST), and the temperature-sensitive side chain includes a plurality of temperature-sensitive side chains that form a hydrogen bond between the plurality of temperature-sensitive side chains so as to be reversibly agglomerated at a second temperature of greater than or equal to the lower critical solution temperature (LCST).

8. The draw solute for forward osmosis of claim 1, wherein greater than or equal to about 50 wt % of the copolymer has a first particle size at a first temperature below a lower critical solution temperature (LCST) and a second particle size at a second temperature above the lower critical solution temperature (LCST), the second particle size being about 10 to about 10,000 times that of the first particle size.

9. A forward osmosis water treatment device comprising:
a feed solution including subject materials and feed water;
an osmosis draw solution including the draw solute for forward osmosis according to claim 1 and draw water;
a semi-permeable membrane having a first side and a second side, the first side contacting the feed solution, the second side contacting the osmosis draw solution, the semi-permeable membrane configured to allow the feed water of the feed solution to pass through to join the osmosis draw solution to form a combined solution while excluding the subject materials of the feed solution;
a recovery system configured to separate and recover the draw solute from the combined solution to produce treated water; and
a connector configured to reintroduce the draw solute recovered by the recovery system into the osmosis draw solution contacting the second side of the semi-permeable membrane.

10. The forward osmosis water treatment device of claim 9, further comprising:
an outlet configured to output the treated water from the combined solution in the recovery system.

11. The forward osmosis water treatment device of claim 9, wherein the recovery system includes a recovery temperature controller configured to heat the combined solution to greater than or equal to a lower critical solution temperature (LCST) so as to reversibly agglomerate the draw solute as a precipitate in the combined solution.

12. The forward osmosis water treatment device of claim 9, wherein the connector includes a connector temperature controller configured to cool the recovered draw solute to less than a lower critical solution temperature (LCST) so as to dissolve the recovered draw solute in the osmosis draw solution.

13. The forward osmosis water treatment device of claim 9, wherein the recovery system includes a microfiltration (MF) membrane, an ultrafiltration (UF) membrane, a nanofiltration (NF) membrane, or a centrifuge.

14. A forward osmosis method for water treatment, comprising:
contacting a feed solution and an osmosis draw solution with a semi-permeable membrane, the feed solution including subject materials and feed water, the osmosis draw solution including the draw solute for forward osmosis according to claim 1 and draw water;

drawing the feed water in the feed solution through the semi-permeable membrane and into the osmosis draw solution by osmotic pressure to form a combined solution while excluding the subject materials in the feed solution;

heating the combined solution to a temperature above a lower critical solution temperature (LOST) so as to reversibly agglomerate the draw solute as a precipitate in the combined solution; and separating and recovering the precipitate from the combined solution to produce recovered draw solute and treated water.

15. The method of claim 14, further comprising:

cooling the recovered draw solute to a temperature below the lower critical solution temperature (LCST) so as to dissolve the draw solute into the osmosis draw solution contacting the semi-permeable membrane.

16. The draw solute for forward osmosis of claim 5, wherein the copolymer has a number average molecular weight of about 5000 to about 50,000.

17. The draw solute for forward osmosis of claim 1, wherein the first side chain includes sulfur.

18. The draw solute for forward osmosis of claim 1, wherein the second side chain is *—CH2CH2OH.

* * * * *